US008611235B2

(12) United States Patent
Edwards, III et al.

(10) Patent No.: US 8,611,235 B2
(45) Date of Patent: Dec. 17, 2013

(54) EXTENDED REACH DATA NETWORK

(75) Inventors: James William Edwards, III, Lakeway, TX (US); Richard L. House, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 11/763,075

(22) Filed: Jun. 14, 2007

(65) Prior Publication Data

US 2008/0310304 A1  Dec. 18, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......................................................... 370/252

(58) Field of Classification Search
USPC .......................... 370/233, 229, 234, 235, 242
See application file for complete search history.

(56) References Cited

U.S. PATENT DOCUMENTS

| | | | | |
|---|---|---|---|---|
| 5,734,967 A * | 3/1998 | Kotzin et al. | ................ | 455/63.1 |
| 5,768,312 A * | 6/1998 | Imamura | ........................ | 375/228 |
| 6,529,957 B1 * | 3/2003 | Joergensen | .................... | 709/233 |
| 6,532,215 B1 | 3/2003 | Muntz | | |
| 6,549,520 B1 * | 4/2003 | Gross et al. | ................... | 370/242 |
| 7,032,139 B1 * | 4/2006 | Iryami et al. | ................... | 714/704 |
| 7,173,431 B1 * | 2/2007 | Lo et al. | ......................... | 324/543 |
| 7,353,407 B2 | 4/2008 | Diab et al. | | |
| 7,457,252 B2 | 11/2008 | Karam et al. | | |
| 7,499,708 B2 * | 3/2009 | Singh et al. | ................... | 455/454 |
| 7,557,104 B2 | 7/2009 | Zhao et al. | | |
| 7,593,315 B2 | 9/2009 | Barrass | | |
| 7,593,747 B1 | 9/2009 | Karam et al. | | |
| 7,607,033 B2 | 10/2009 | Diab et al. | | |
| 7,669,321 B1 | 3/2010 | Levy et al. | | |
| 2002/0005863 A1 * | 1/2002 | Nagai et al. | ................... | 345/698 |
| 2005/0071514 A1 * | 3/2005 | Anderson et al. | ................. | 710/1 |
| 2006/0167642 A1 * | 7/2006 | Ferrer et al. | .................... | 702/79 |
| 2006/0181283 A1 * | 8/2006 | Wajcer et al. | ................. | 324/539 |
| 2006/0182039 A1 * | 8/2006 | Jourdain et al. | ............. | 370/252 |
| 2006/0198396 A1 * | 9/2006 | Chang et al. | ................. | 370/522 |
| 2007/0121663 A1 * | 5/2007 | Yousefi et al. | ................ | 370/446 |
| 2008/0026749 A1 * | 1/2008 | Gautier et al. | ............ | 455/435.1 |
| 2008/0030202 A1 * | 2/2008 | Wang | ............................ | 324/533 |
| 2008/0063399 A1 * | 3/2008 | Mallya et al. | ................... | 398/75 |
| 2008/0259901 A1 * | 10/2008 | Friedman et al. | ............. | 370/349 |

OTHER PUBLICATIONS

Leon Garcia Widjaja, 2000, McGraw-Hill Companies Inc., Communication Networks Fundamental Concepts and Key Architectures, p. 110.*
"Troubleshooting Overview," Cisco ONS 15540 ESP Troubleshooting Guide, Cisco Systems, Inc., Feb. 16, 2006, pp. 1-1 to 1-12.

* cited by examiner

*Primary Examiner* — Huy D Vu
*Assistant Examiner* — Adnan Baig
(74) *Attorney, Agent, or Firm* — Novak Druce Connolly Bove + Quigg LLP

(57) ABSTRACT

In one embodiment, estimating a length of a network connection, determining whether the estimated network connection length deviates from a predetermined threshold range, modifying one or more signal characteristics when it is determined that the estimated network connection length deviates from the predetermined threshold range are provided.

12 Claims, 5 Drawing Sheets

EXTENDED REACH DATA NETWORK

TECHNICAL FIELD

The present disclosure relates generally to extending network connection range in data networks.

BACKGROUND

Existing data network infrastructure including copper based Ethernet networks is generally limited to a range of approximately 100 meters over Category 5 cabling. Such range or distance limitation typically imposes a constraint in the deployment of Ethernet network in otherwise suitable situations where the distance from a network switch to the farthest user or network device or host terminal exceeds the afore-mentioned distance limit. For example, in multi-tenant dwellings or office buildings where host terminal locations may be beyond the range limit from the nearest network switch, deployment of Ethernet network would pose a substantial hurdle.

While solutions to the range limitation exist for other physical layers such as digital subscriber line (DSL) networks or optical fiber networks, copper based Ethernet networks remain limited in deployment by range even though the Ethernet network may provide significant cost savings and/or deployment advantages compared to other existing physical layer approaches.

SUMMARY

Overview

A method in particular embodiments may include estimating a length of a network connection, determining whether the estimated connection length deviates from a predetermined threshold range, and modifying one or more signal characteristics when it is determined that the estimated connection signal deviates from the predetermined threshold range.

A method in particular embodiments may further include transmitting a signal on a network connection, determining a bit error rate on the network connection based on the transmitted signal, determining whether the bit error rate deviates from a predetermined threshold range, and modifying one or more signal characteristics when it is determined that the bit error rate deviates from the predetermined threshold range.

An apparatus in particular embodiments may include a network interface, one or more processors coupled to the network interface, and a memory for storing instructions which, when executed by the one or more processors, causes the one or more processors to estimate a length of a network connection, determine whether the estimated connection length deviates from a predetermined threshold range, and modify one or more signal characteristics when it is determined that the estimated connection signal deviates from the predetermined threshold range.

An apparatus in particular embodiments may further include means for estimating a length of a network connection, means for determining whether the estimated connection length deviates from a predetermined threshold range, means for modifying one or more signal characteristics when it is determined that the estimated connection signal deviates from the predetermined threshold range.

These and other features and advantages of the present disclosure will be understood upon consideration of the following description of the particular embodiments and the accompanying drawings.

DETAILED DESCRIPTION

Figure 1:
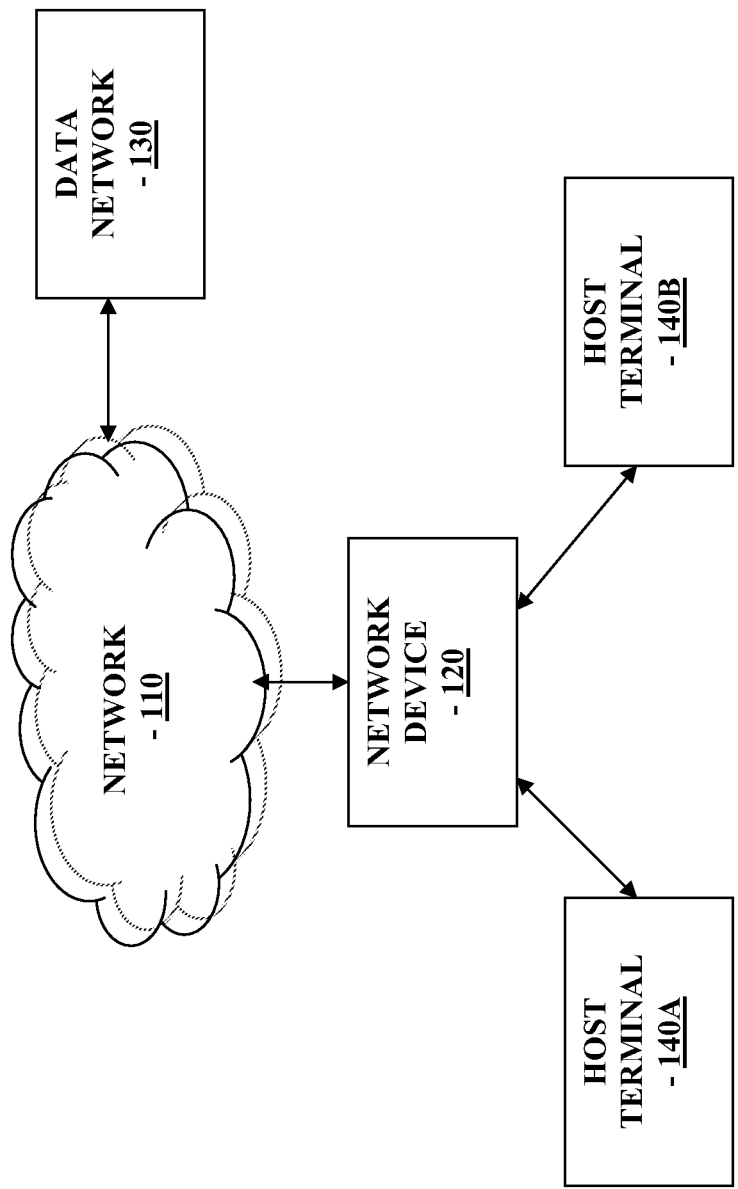
FIG. 1 is an example system for providing extended range in a data network.

FIG. 1 is an example system for providing extended range in a data network. Referring to FIG. 1, in particular embodiments, network device 120 is configured to operatively couple to a network 110, and further to a plurality of host terminals 140A, 140B. In particular embodiments, network device 120 may include one or more of a network switch, a router, broadband modem, residential gateway, network interface cards, or another other network device configured to operatively couple to one or more host terminals for communication with the network 110. Referring back to FIG. 1, the network 110 may be further coupled to other data networks such as data network 130, such that the one or more host terminals 140A, 140B may be configured to communicate with one or more other network devices or host terminals operatively coupled to the data network 130 over the network 110.

Figure 2:
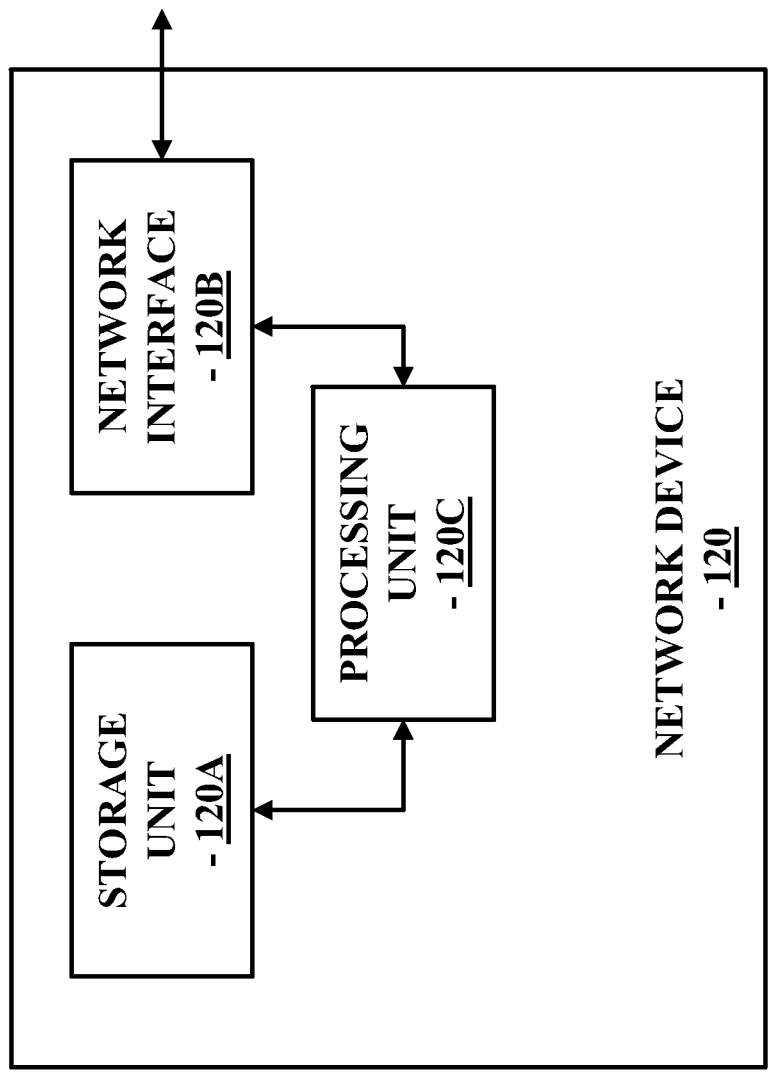
FIG. 2 illustrates an example network device in the system illustrated in FIG. 1.

FIG. 2 illustrates an example network device in the system illustrated in FIG. 1. Referring to FIG. 2, the network device 120 in particular embodiments includes a storage unit 120A operatively coupled to a processing unit 120C. In particular embodiments, the processing unit 120C may include one or more microprocessors for retrieving and/or storing data from the storage unit 120A, and further, for executing instructions stored in, for example, the storage unit 120A, for implementing one or more associated functions related to extending the range of the data network. In one aspect, the processing unit 120C may include, for example, but not limited to a digital signal processing unit, or an Application Specific Integrated Circuit (ASIC) with configuration parameters implemented or programmed by an external processor. Referring again to FIG. 2, in one aspect, the network device 120 may include a network interface 120B which may be configured to interface with for example, the network 110 (FIG. 1) or one or more host terminals 140A, 140B, data network 130 operatively coupled to the network 110.

In particular embodiments, as discussed in further detail below, the memory or storage unit 120A of the network device 120 may be configured to store instructions which may be executed by the processing unit 120C to estimate a length of a network connection, determine whether the estimated connection length deviates from a predetermined threshold range, and modify one or more signal characteristics when it is determined that the estimated connection signal deviates from the predetermined threshold range.

Figure 3:
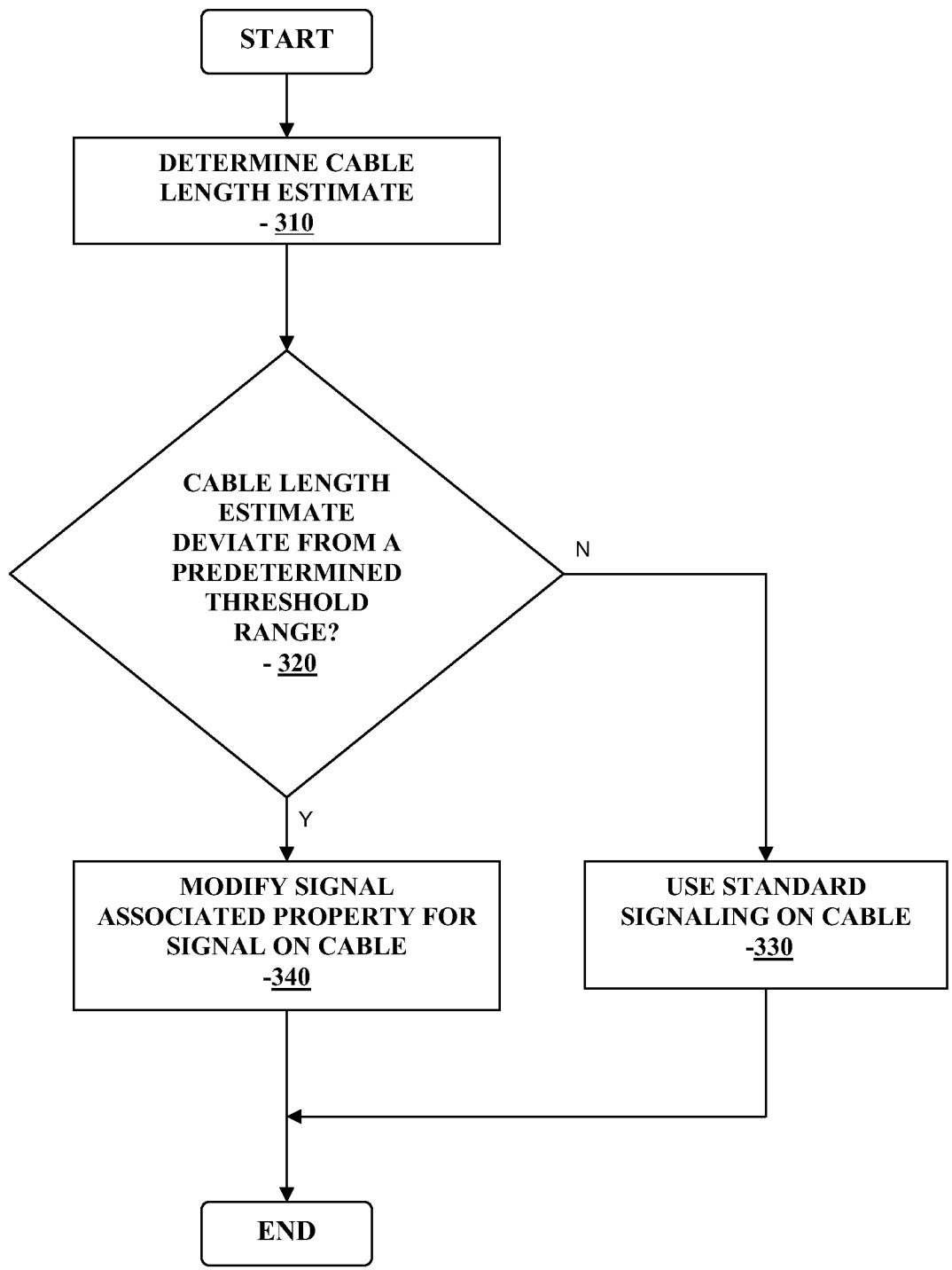
FIG. 3 illustrates an example method for extending reach in a data network.

FIG. 3 illustrates an example method for extending reach in a data network. Referring to FIG. 3, at step 310, the cable length estimate, for example, between network device 120 (FIG. 1) and host terminal 140A may be determined. For example, using time domain reflectometry (TDR) based approach or other suitable techniques, an approximate estimate of the cable connection length is determined. Referring back to FIG. 3, after determining the approximate cable length estimate, it is determined whether the estimated cable length deviates from a predetermined threshold range at step 320. In particular embodiments, the predetermined threshold range may be determined based on the particular network deployment configuration including, for example, the network device deployed, and/or the host terminals supported in the deployed network. For example, Gigabit Ethernet may be limited to approximately 100 meters over Category 5 cable length to ensure that the operation of the signal amplitudes and functional operations are within the desired specification.

Referring again to FIG. 3, if it is determined that the estimated cable length does not deviate from the predetermined threshold range at step 320, then at step 330, the standard signaling for the particular cable whose length was estimated may be used, and the routine ends. On the other hand, if it is determined at step 320 that the estimated cable length deviates from the predetermined threshold range, then at step 340, then one or more signal associated properties for the signals on the cable is modified based, for example, the determined deviation from the predetermined threshold range, and the routine ends.

As discussed in further detail below, in particular embodiments, if it is determined that the estimated cable length exceeds a predetermined range or length, then the signal amplitude on the cable may be increased such that the estimated cable length deployed in the network is configured to support the signals. Moreover, in particular embodiments, when it is determined that the estimated cable length exceeds the predetermined range or length, alternate signaling mechanism or alternate transceiver may be used to support the signals on the cable whose length is determined to exceed the predetermined range or length. In addition, in particular embodiments, the signal speed may be lowered to support the extended distance of the cable whose length was estimated to exceed the predetermined range or length.

On the other hand, in particular embodiments, if it is determined that the estimated cable length is below the predetermined range or length, then the signal amplitude may be reduced or tuned for higher reliability at the shorter distance (for example, so as to modify the signaling template—that is, the shape of the signal profile). In a further embodiment, signal power may be reduced on the cable whose length is determined to be less than the predetermined range or length.

Figure 4:
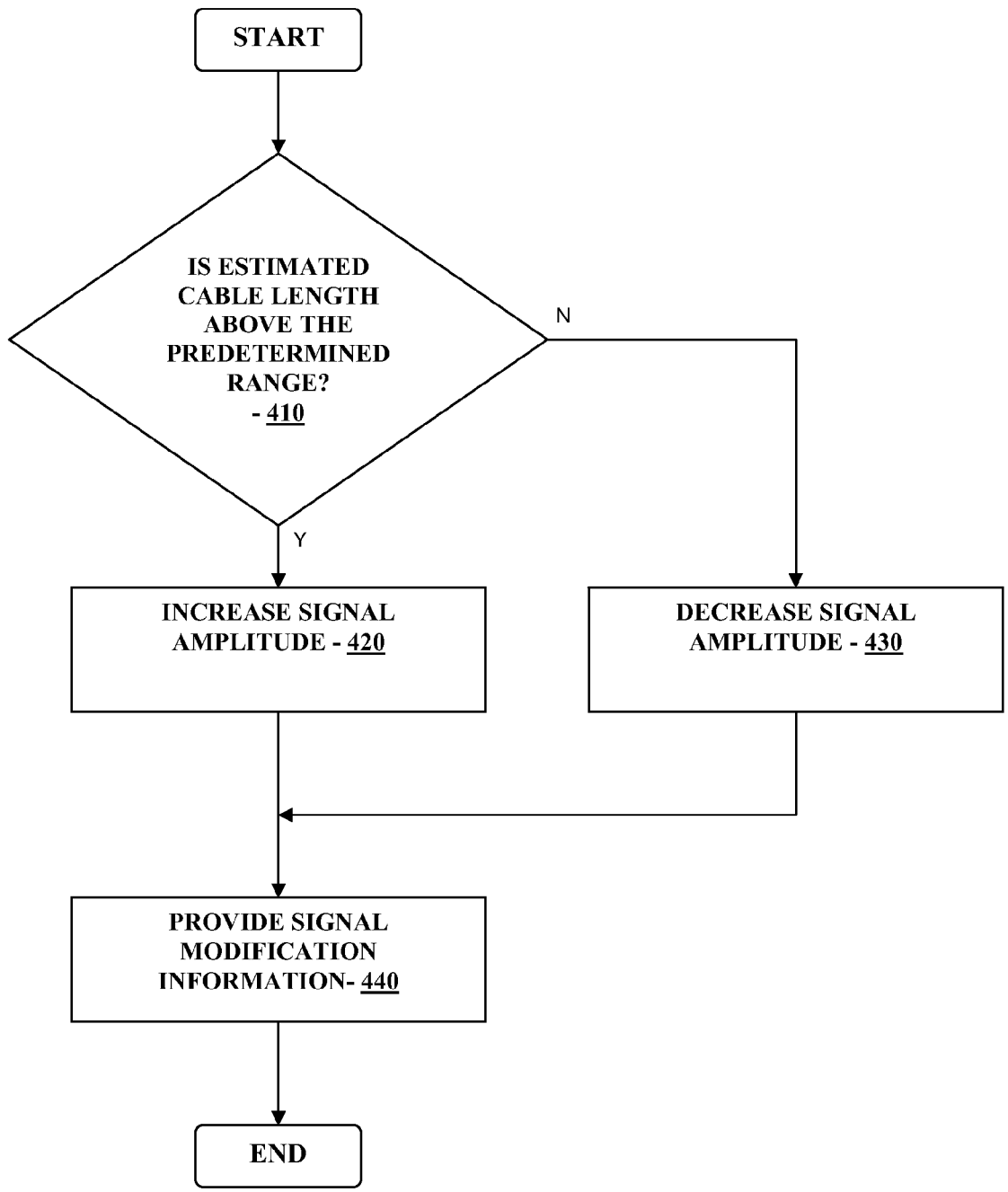
FIG. 4 illustrates an example method for extending reach in a data network.

FIG. 4 illustrates an example method for extending reach in a data network. More specifically, a detailed routine for modifying the signal associated property or characteristic for the signal on the cable based on the estimated cable length exceeding the predetermined threshold range (FIG. 3) is described. Referring to FIG. 4, in particular embodiments, at step 410, it is determined whether the determined cable length estimate is above the predetermined threshold range. If it is determined that the determined cable length estimate is not above the predetermined threshold range (and thus, is below the predetermined threshold range), then at step 430, the signal amplitude is decreased for the signals on the cable whose length estimate is determined.

On the other hand, referring again to FIG. 4, if at step 410 it is determined that the determined cable length estimate is above the predetermined threshold range (for example, the distance of the host terminal from the network switch exceeds the approximately 100 meter limitation in a Category 5 cabling deployment environment), the at step 420 the signal amplitude is increased such that the extended distance of the cable supports the signals provided thereon. Referring again to FIG. 4, at step 440, the signal modification information is provided to the other device or terminal connected by the cable. For example, in particular embodiments, notification related to the increased or decreased amplitude, and the underlying value may be communicated the other device or terminal connected by the cable, and further, the notification may be transmitted inband (for example, on the same communication link) or out of band (for example, through a separate management network).

Figure 5:
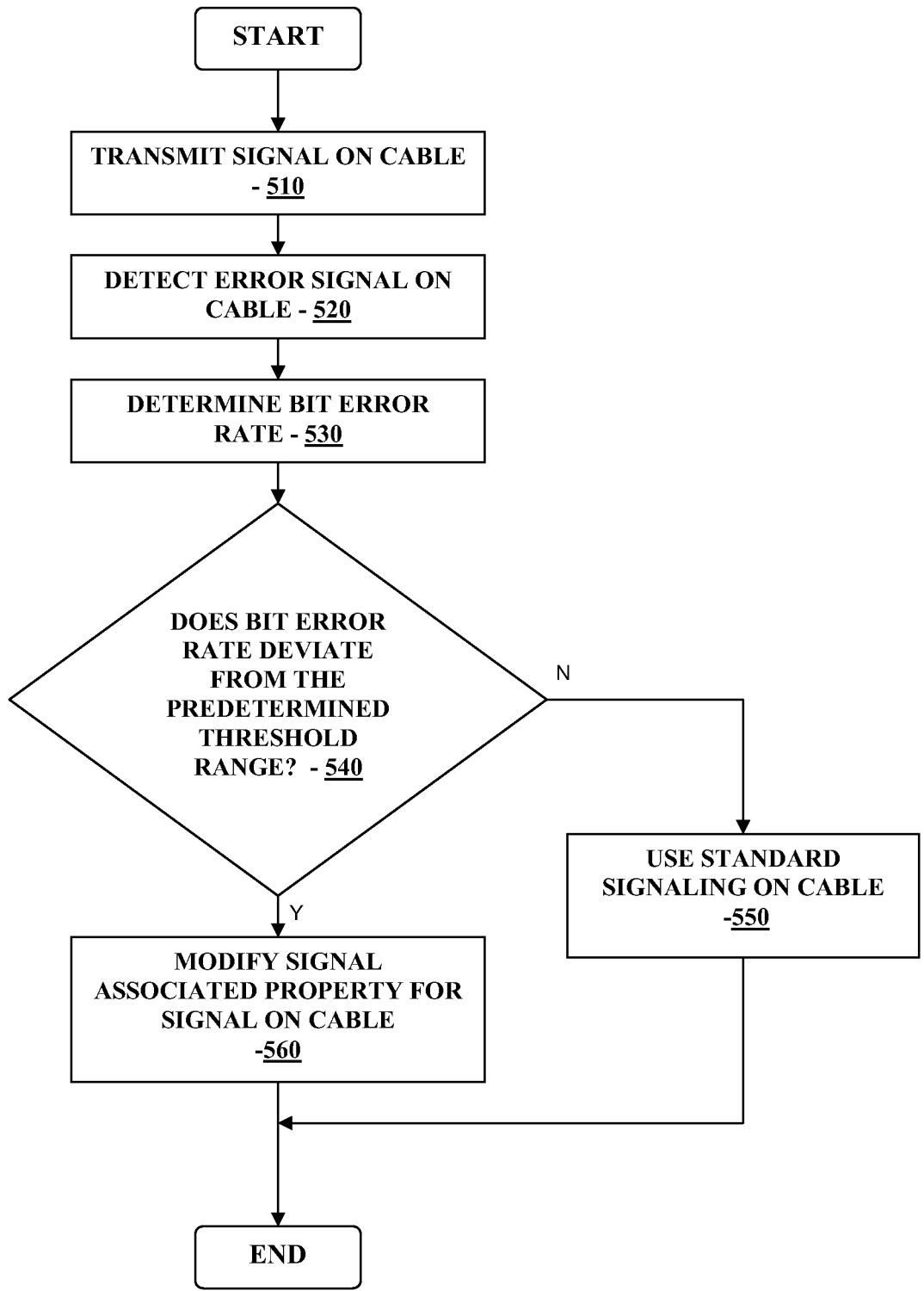
FIG. 5 illustrates an example method for extending reach in a data network.

FIG. 5 illustrates an example method for extending reach in a data network. Referring to FIG. 5, in particular embodiments, at step 510 a signal such as a test signal is transmitted on the cable connecting, for example, the deployed host terminal to a port on the network device 120 in the network 100 (FIG. 1). Thereafter at step 520, when an error signal is detected on the cable based on the transmitted test signal, a bit error rate is determined at step 530. That is, the bit error rate may be determined using known techniques, such as, for example, for a bit error rate of $1\times10$, no more than one error for every 1,000,000,000 bits should be transmitted.

Thereafter, at step 540, it is determined whether the determined bit error rate deviates from a predetermined threshold range. For example, in one aspect, the predetermined threshold range may be associated with an estimated network cable length, and wherein when the determined bit error rate deviates from the predetermined threshold range, in one aspect, it may be determined that signal compensation may be needed (for example, by increasing the amplitude of the signal on the network cable). If it is determined at step 540 that the determined bit error rate on the cable does not deviate from the predetermined threshold range, then at step 550, the standard signaling is used on the cable, and the routine ends.

On the other hand, if it is determined at step 540 that the determined bit error rate deviates from the predetermined threshold range, then at step 560, the one or more signal associated properties is modified for the signals on the cable to compensate or account for the determined deviation from the predetermined threshold range. For example, if it is determined that the determined bit error rate exceeds the predetermined threshold limit, the signal amplitude may be increased to compensate for the determined bit error rate that exceeds the predetermined threshold range. In addition, in particular embodiments, alternate transceiver or signaling mechanism as discussed above may be supported or used to compensate for the determined bit error rate which exceeds the predetermined threshold range. Further, in particular embodiments, the signal speed may be lowered to compensate for the determined bit error rate such that the deployed network may be configured to support the signaling characteristics.

In particular embodiments, the routine described above in conjunction with FIGS. 3-5 may be implemented in an application specific integrated circuit (ASIC) design as part of, for example, Ethernet MAC, transceiver or as a separate portion, or in a software environment, or alternatively in a combination of both hardware and software.

In the manner described above, in particular embodiments, signaling on the cable or wire may be modified based on the estimated cable length determined manually or by one or more cable diagnostic functions using TDR or DSP based implementation for estimating the approximate length of the deployed cable connection. More specifically, in particular embodiments, based on the determined cable length estimate, one or more signal characteristics may be modified to support the deployed network including, for example, the extended distance of the cable connection, reduction in radiated emissions, reduction in power consumption levels, or any other desired network deployment characteristics. In particular embodiments, the one or more modifications to the signal characteristics may include the signal amplitude, signal encoding mechanisms (modifying the signal template or signal shape reference) or approaches, changes to the signal speed, or switching between multiple transceivers (for example, switching between DSL or Ethernet on the wire automatically based on the determined cable length estimate to attain the extended reach in the network deployment). For example, in particular embodiments, a multiplexer may be used to direct the signal to one of the multiple transceivers to attain the automatic switching based on one or more predetermined switching relationship (such as, for example, using Ethernet transceiver for distance less than 100M, and using a DSL transceiver for distances greater than 100M).

A method in accordance with one embodiment may include estimating a length of a network connection, determining whether the estimated network connection length deviates from a predetermined threshold range, and modifying one or more signal characteristics when it is determined that the estimated network connection length deviates from the predetermined threshold range.

In one aspect, the network connection length may be estimated based on time domain reflectometry.

In one aspect, the one or more signal characteristics may include signal amplitude, signal power level, signal transmission speed, or signal encoding mechanism (for example, signal template/shape reference).

When the estimated network connection length is determined to exceed the predetermined threshold range, the modifying step may include increasing the amplitude of the signal provided on the network connection. On the other hand, when the estimated network connection length is determined to be below the predetermined threshold range, the modifying step may include decreasing the amplitude of the signal provided on the network connection.

In still a further aspect, the method may include transmitting information associated with the one or more modified signal characteristics to an entity coupled to the network connection.

The length of the network connection may be estimated manually.

Also, the network connection may include an Ethernet network connection, and in particular, may include a Category 3 cable, or a Category 5 cable.

A method in accordance with another aspect may include transmitting a signal on a network connection, determining a bit error rate on the network connection based on the transmitted signal, determining whether the bit error rate deviates from a predetermined threshold range associated with an estimated network connection length, and modifying one or more signal characteristics when it is determined that the bit error rate deviates from the predetermined threshold range.

In one aspect, when the bit error rate is determined to exceed the predetermined threshold range, the modifying step may include increasing the amplitude of the signal provided on the network connection. On the other hand, when the bit error rate is determined to be below the predetermined threshold range, the modifying step may include decreasing the amplitude of the signal provided on the network connection. Alternatively, when the bit error rate is determined to be below the predetermined threshold range, the modifying step may include maintaining the signal amplitude provided on the network connection.

The method may also include transmitting information associated with the one or more modified signal characteristics to an entity coupled to the network connection.

An apparatus in accordance with still another aspect may include a network interface, one or more processors coupled to the network interface, and a memory for storing instructions which, when executed by the one or more processors, causes the one or more processors to estimate a length of a network connection, determine whether the estimated network connection length deviates from a predetermined threshold range, and modify one or more signal characteristics when it is determined that the estimated network connection length deviates from the predetermined threshold range.

An apparatus in accordance with yet still another aspect may include means for estimating a length of a network connection, means for determining whether the estimated network connection length deviates from a predetermined threshold range, and means for modifying one or more signal characteristics when it is determined that the estimated network connection length deviates from the predetermined threshold range.

The various processes described above including the processes performed by the network device 120 or one or more of the host terminals 140A, 140B in the software application execution environment in the example system 100 including the processes and routines described in conjunction with FIGS. 3-5, may be embodied as computer programs developed using an object oriented language that allows the modeling of complex systems with modular objects to create abstractions that are representative of real world, physical objects and their interrelationships. The software required to carry out the inventive process, which may be stored in the memory or storage unit 120A of the network device 120 (or similar storage unit or memory in the one or more host terminals 140A, 140B), may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:

estimating a length of a wired network connection deployed and extending between a first network entity and a second network entity, the network connection configured to carry an Ethernet signal between the first and second network entities;

determining whether the estimated network connection length deviates from a predetermined threshold range;

modifying, by an Ethernet transceiver at the first network entity, a signal amplitude of the Ethernet signal when it is determined that the estimated network connection length deviates from the predetermined threshold range to increase the signal amplitude when the estimated network connection length exceeds the predetermined threshold range and to decrease the signal amplitude when the estimated network connection length is less than the predetermined threshold range determining a bit error rate on the network connection; determining whether the estimated bit error rate is above or below a predetermined bit error rate;

modifying, by the Ethernet transceiver at the first network entity, a signal amplitude of the Ethernet signal to increase the signal amplitude when the bit error rate exceeds the predetermined bit error rate and to decrease the signal amplitude when the bit error rate is less than the predetermined bit error rate; and providing a notification to the second network entity in band over the wired network connection.

2. The method of claim 1 wherein the network connection length is estimated based on time domain reflectometry.

3. The method of claim 1 further including transmitting one or more notification messages from the first network entity to the second network entity.

4. The method of claim 1 wherein the length of the network connection is estimated manually.

5. The method of claim 1 wherein the network connection includes a Gigabyte Ethernet network connection.

6. The method of claim 1 wherein the network connection includes a Category 3 cable, or a Category 5 cable.

7. An apparatus, comprising:
a network interface;
one or more processors coupled to the network interface; and
a memory for storing instructions which, when executed by the one or more processors, causes the one or more processors to
estimate a length of a wired network connection deployed and extending between the apparatus and a network entity, the network connection configured to carry an Ethernet signal,
determine whether the estimated network connection length deviates from a predetermined threshold range, and
modify a signal amplitude of the Ethernet signal when it is determined that the estimated network connection length deviates from the predetermined threshold range to increase the signal amplitude when the estimated network connection length exceeds the predetermined threshold range and to decrease the signal amplitude when the estimated network connection length is less than the predetermined threshold range
determining a bit error rate on the network connection;
determine whether the estimated bit error rate is above or below a predetermined bit error rate;
modify the signal amplitude of the Ethernet signal to increase the signal amplitude when the bit error rate exceeds the predetermined bit error rate and to decrease the signal amplitude when the bit error rate is less than the predetermined bit error rate, and,
provide a notification to the network entity in band over the wired network connection.

8. The apparatus of claim 7 wherein the network connection includes a Gigabyte Ethernet network connection.

9. A method comprising:
estimating a length of a wired network connection extending between a first network entity and a second network entity, the network connection configured to carry an Ethernet signal between the first and second network entities;
determining whether the estimated network connection length is above or below a predetermined threshold range for the Ethernet signal;
when it is determined that the estimated network connection length is above the predetermined threshold range for the Ethernet signal, modifying the Ethernet signal, by a transceiver at the first network entity, to increase a signal amplitude provided onto the network connection;
when it is determined that the estimated network connection length is below the predetermined threshold range for the Ethernet signal, modifying the Ethernet signal, by the transceiver at the first network entity, to reduce the signal amplitude provided onto the network connection;
determining a bit error rate on the network connection;
determining whether the estimated bit error rate is above or below a predetermined bit error rate;
when it is determined that the bit error rate is above the predetermined bit error rate, modifying the Ethernet signal, by the transceiver at the first network entity, to increase the signal amplitude provided onto the network connection; and
when it is determined that the bit error rate is below the predetermined bit error rate, modifying the Ethernet signal, by the transceiver at the first network entity, to reduce the signal amplitude provided onto the network connection.

10. The method of claim 9, wherein the providing comprises:
transmitting a notification from the first network entity to the second network entity out of band over a separate management network.

11. The method of claim 9, wherein the estimating a length of a wired network connection comprises:
using time domain reflectometry (TDR) to estimate the length of the wired network connection.

12. The method of claim 9, wherein the providing comprises:
transmitting a notification from the first network entity to the second network entity in band over the wired network connection.

* * * * *